Feb. 16, 1926.
A. GESSNER, JR
1,573,390
MANUFACTURE OF RUBBER COATED WEFTLESS CORD FABRIC
Filed August 18, 1922
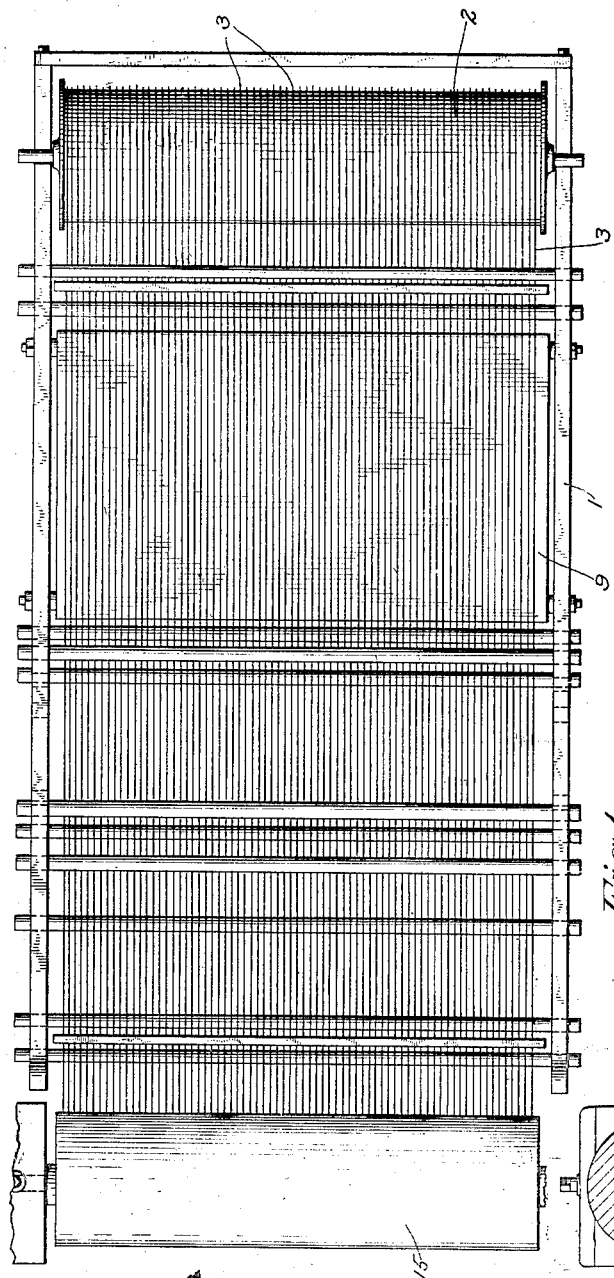
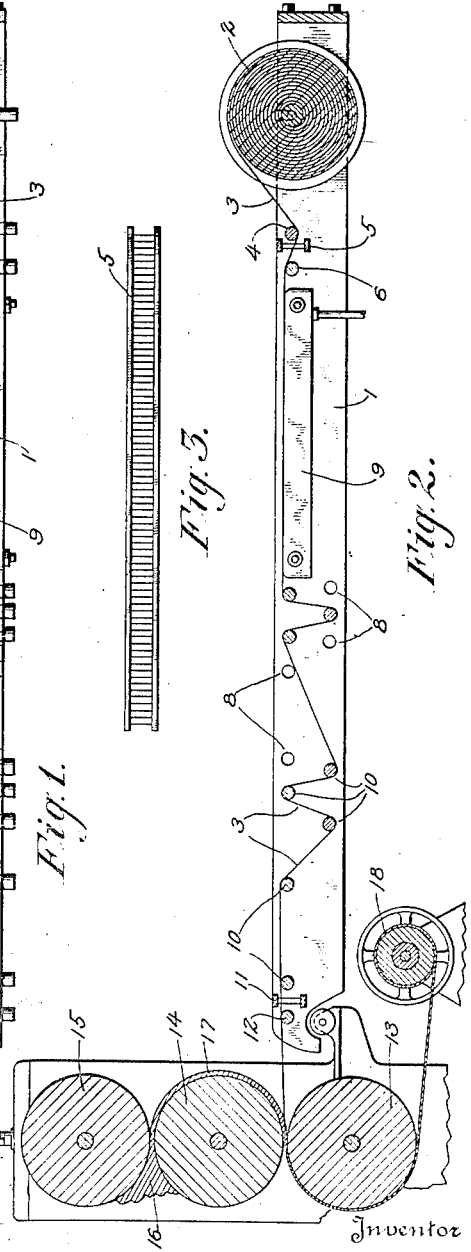

Patented Feb. 16, 1926.

1,573,390

UNITED STATES PATENT OFFICE.

ALBERT GESSNER, JR., OF MORGANTOWN, WEST VIRGINIA.

MANUFACTURE OF RUBBER-COATED WEFTLESS-CORD FABRIC.

Application filed August 18, 1922. Serial No. 582,771.

*To all whom it may concern:*

Be it known that I, ALBERT GESSNER, Jr., citizen of the United States, residing at Morgantown, in the county of Monongalia and State of West Virginia, have invented certain new and useful Improvements in the Manufacture of Rubber-Coated Weftless-Cord Fabric, of which the following is a specification.

My invention relates to the manufacture of rubber coated weftless cord fabric adapted to be used particularly in the production of tire casings and inner tubes. Various unsuccessful attempts have heretofore been made to produce a fabric consisting only of parallel cords surrounded by and united into a sheet by a coating of unvulcanized rubber. In attempting to coat parallel strands of cord directly with unvulcanized rubber by passing them through calendar rolls, the difficulty has been to keep the strands in parallel and undistorted relationship as they are passing through the said rolls.

One of the objects of my invention is to apply a coating of unvulcanized rubber to a parallel strand weftless fabric in such a manner that in the finished product, the strands will still be parallel and each strand completely surrounded with unvulcanized rubber, thus providing a fabric adapted for use in the manufacture of tires without further steps. I am enabled to successfully coat a weftless cord fabric with unvulcanized rubber in this manner, due to the fact that the parallel cords are kept under a sufficiently high degree of tension while they are passing through the calender rolls, as will overcome any tendency of the rolls to throw the cords out of alignment.

It will be understood that the method may be susceptible of being carried out by various types of machines and the specific embodiment illustrated and described herein is only indicative of the principle of the invention; however, this specific embodiment is one which has been found to be practical in its construction and operation.

Referring to the drawings for a more complete disclosure of the invention:

Fig. 1 is a plan view of the machine;

Fig. 2 is a sectional longitudinal view;

Fig. 3 is a detail view of the reed, and

Fig. 4 is a transverse section through the finished fabric.

Mounted to rotate in the frame 1 of the machine is the customary warp beam 2 having a plurality of cords or strands 3 thereon. After leaving the beam, the cords 3 pass under a tension bar 4, then through a reed 5 which spaces and aligns the cords in a predetermined manner, then over a tension bar 6. A varied arrangement of tension bars may be had and the object of the same is, by the frictional contact of the cords and bars as the cords are pulled through the machine, to offer such resistance as will keep the cords under the desired tension while they are passing through the calender rolls. The amount of friction and hence the amount of tension in the cords can be readily varied by the number of tension bars which may be used and the relative angular location of the same with respect to each other. The amount of friction applied to all the cords being substantially the same, it will result that the tension in all of them will be substantially the same. The tension bars may be round, flat, square or any desired shape and are non-rotatively mounted in the frame. Various apertures 8 may be provided in which the tension bars may be removably supported.

After passing the tension bar 6 the cords pass over the steam heater 9 and are heated so as to facilitate the adherence of the subsequently applied rubber. Various tension bars 10 are interposed between the steam heater and another reed 11, the cords then passing over a final tension bar 12 and between the calender rolls 13 and 14.

The calendering apparatus comprises three superposed rolls 13, 14 and 15, these rolls being positively driven at the desired speed and between the upper rolls, the stock 16 of unvulcanized rubber is fed, which is rolled out into a sheet 17 and as it passes between the rolls 13 and 14, the cords 3 by the pressure of the rolls become embedded therein. Thereafter the rubberized cord passes to the calender take up roll 18 which is driven at such a speed as will pull the fabric through the machine at the desired tension.

It will be noted that the finished fabric as shown in Fig. 4 comprises the parallel cords 3 and that they are separated from each other and completely surrounded by a layer of unvulcanized rubber.

I claim:

1. An apparatus for making weftless cord fabric comprising a warp beam constituting a supply for a plurality of cords, means for laying the cords in sheet form in parallel relationship, calender rolls for applying unvulcanized rubber thereto and non-rotatable bars, between the source of supply and the calender rolls, with which the cords are in frictional contact as they are pulled through the apparatus for holding all the cords under equal tension, all the cords being in the same plane.

2. An apparatus for making weftless cord fabric comprising a warp beam constituting a supply for a plurality of cords, means for laying the cords in sheet form in parallel relationship, calender rolls for applying unvulcanized rubber thereto and non-rotatable bars, between the source of supply and the calender rolls, with which the cords are in frictional contact as they are pulled through the apparatus for holding all the cords under equal tension, the said cords passing under some of the bars and over others, and all of the cords being in the same plane.

3. An apparatus for making weftless cord fabric comprising a warp beam constituting a supply for a plurality of cords, means for laying the cords in sheet form in parallel relationship, calender rolls for applying unvulcanized rubber thereto and non-rotatable bars, between the source of supply and the calender rolls, with which the cords are in frictional contact as they are pulled through the apparatus for holding all the cords under equal tension, the said cords passing under some of the bars and over others and all the cords being in the same plane, and means whereby the tension of the cords may be varied by varying the number of bars.

4. An apparatus for making weftless cord fabric comprising a warp beam constituting a supply for a plurality of cords, means for laying the cords in sheet form in parallel relationship, calender rolls for applying unvulcanized rubber thereto and non-rotatable bars, between the source of supply and the calender rolls, with which the cords are in frictional contact as they are pulled through the apparatus for holding all the cords under equal tension, all the cords being in the same plane, and means whereby the tension of the cords may be varied by changing the angular location of the bars with respect to each other.

In testimony whereof I affix my signature.

ALBERT GESSNER, Jr.